United States Patent [19]
Mizukami

[11] Patent Number: 5,935,008
[45] Date of Patent: Aug. 10, 1999

[54] FLYWHEEL ASSEMBLY HAVING A DAMPER MECHANISM THAT INCLUDES A FRICTION HYSTERISIS GENERATING DEVICE

[75] Inventor: Hiroshi Mizukami, Neyagawa, Japan

[73] Assignee: EXEDY Corporation, Neyagawa, Japan

[21] Appl. No.: 08/917,084

[22] Filed: Aug. 25, 1997

[30] Foreign Application Priority Data

Aug. 28, 1996 [JP] Japan .................................. 8-226742

[51] Int. Cl.⁶ .................................................. F16D 3/10
[52] U.S. Cl. ........................................ 464/68; 192/214.1
[58] Field of Search ....................... 464/66, 68; 192/212, 192/214.1, 214

[56] References Cited

U.S. PATENT DOCUMENTS

| | | | |
|---|---|---|---|
| 4,601,676 | 7/1986 | Tojima et al. | 464/68 |
| 4,820,239 | 4/1989 | Despres et al. | 464/68 |
| 4,906,220 | 3/1990 | Woner et al. | 464/68 |
| 5,030,166 | 7/1991 | Worner et al. | 192/214.1 |
| 5,139,124 | 8/1992 | Friedmann | 192/214.1 |
| 5,816,924 | 10/1998 | Kajitani et al. | 464/66 |

FOREIGN PATENT DOCUMENTS 7-092114  10/1995  Japan .

*Primary Examiner*—Eileen Dunn Lillis
*Attorney, Agent, or Firm*—Shinjyu An Intellectual Property Firm

[57] ABSTRACT

The flywheel assembly 1 includes a first flywheel 2, a second flywheel 3, first and second drive plates 21 and 22, coil springs 24 and a frictional coupling mechanism 7. The first and second drive plates 21 and 22 are arranged relatively rotatably between the first and second flywheels 2 and 3. The coil springs 24 circumferentially elastically couple the first and second drive plates 21 and 22 to the second flywheel 3. The frictional coupling mechanism 7 is arranged radially outside the coil springs 24 for transmitting a torque between the first and second drive plates 21 and 22 and the first flywheel 2 and is also operable to cause a slide when it receives a torque larger than a predetermined torque.

5 Claims, 3 Drawing Sheets

FLYWHEEL ASSEMBLY HAVING A DAMPER MECHANISM THAT INCLUDES A FRICTION HYSTERISIS GENERATING DEVICE

BACKGROUND OF THE INVENTION

A. Field of the Invention

The present invention relates to a flywheel assembly, and in particular to a flywheel assembly including two flywheels with a damper mechanism disposed therebetween.

B. Description of the Background Art

A flywheel is attached to an end of a crankshaft of an engine for preventing variation in rotational speed during a low-speed driving by providing a mass or a moment of inertia. A ring gear for a starter, a clutch mechanism typically are fixed to the flywheel.

One flywheel assembly is formed with a divided flywheel where there are first and second flywheels and a damper mechanism disposed between them. The damper mechanism includes elastic members which are compressed in a circumferential direction of the flywheel assembly when the flywheels rotate relative to each other. The damper mechanism may employ a slider mechanism which operates in a parallel with the elastic members.

A driving system of a vehicle causes noises and vibrations such as gear noises and internal resonance noises during driving. In order to reduce these noises and vibrations, it is necessary to lower the torsional rigidity in an acceleration and deceleration torque range and thereby lower a torsional resonance frequency of the driving system below a service rotation range. In order to lower the torsional rigidity of the damper mechanism, a maximum torsion angle of elastic members may be increased, and/or a plurality of elastic members may be arranged to operate in series.

In a flywheel assembly where two flywheels are employed, the rotation changes through a resonance point at a low rotation range, e.g., lower than 500 rpm during start and stop of the engine. During these operations, an excessive torque variation is generated, which results in breakage of the damper mechanism and/or large noises and vibrations in some cases. For overcoming these problems, a flywheel assembly is known that employs a frictional coupling mechanism arranged for transmitting torque in series with an elastic coupling member, for example, as disclosed in Japanese Patent Publication No. 7-92114 (92114/1995). In the flywheel assembly, when an excessive torque variation occurs during change of the rotation through a resonance point in a low rotation range (e.g., lower than 500 rpm), a slide occurs on a friction member of a frictional coupling mechanism and thereby a large hysteresis torque is produced, by which the vibration is damped. Therefore, noises and vibrations at the time of resonance can be suppressed.

In this flywheel assembly of Japanese Patent Publication No. 7-92114 (92114/1995), however, the frictional coupling mechanism is disposed radially inside the elastic coupling member. Therefore, the friction member has a small radius, and therefore it is difficult to generate a large hysteresis torque. A large pressing load must be applied by a biasing member in order to generate a large hysteresis torque. This causes instability in magnitude of the hysteresis torque.

SUMMARY OF THE INVENTION

One object of the invention is to provide stabilization of hysteresis torque in a hysteresis torque generating mechanism which is employed in a damper mechanism.

In one aspect of the present invention, a flywheel assembly includes a first flywheel and a second flywheel. A radial mid-portion of the first flywheel defines an annular chamber. A first plate is rotatably supported within the annular chamber for rotation with respect to the first flywheel. A second plate is disposed adjacent to the first plate within the annular chamber and is formed with an outer peripheral portion. An elastic member is disposed between the said first and second plates limiting relative rotary displacement therebetween. A frictional coupling mechanism is fixed to the outer peripheral portion radially outward from the first and second windows and the elastic member. The frictional coupling mechanism is configured to generate friction in response to relative rotary displacement between the first flywheel and the second plate thus limiting relative rotary displacement therebetween. In accordance with the present invention, the frictional coupling mechanism includes first and second friction washers fixed to opposite sides of the outer peripheral portion of the second plate. The first friction washer contacts an annular surface formed within the annular chamber of the first flywheel. A pressing plate contacts the second friction washer and an annular spring engaging a surface of the pressing plate. A retaining plate is fixed to an outer peripheral portion of the first flywheel such that the first and second friction washers, the pressing plate, the annular spring and the outer peripheral portion are disposed between the retaining plate and the annular surface within the chamber. The annular spring urges the pressing plate toward the second friction washer and urges the first friction washer against the annular surface. The first flywheel is formed with a plurality of circumferentially spaced apart stopper portions at a radially outward periphery thereof. Each of the outer peripheral portions of the second plate is formed with a radially extending protrusion. Each of the protrusions extends between circumferentially adjacent pairs of the stopper portions thus limiting relative rotary displacement between the second plate and the first flywheel to a predetermined angle. The pressing plate is fixed to the stopper portions such that the pressing plate rotates together with the first flywheel and may undergo limited axial movement in response to wear of the first and second friction washers. Further, the pressing plate, the stopper portions and adjacent portions of the first flywheel define circumferentially extending slits into which the protrusions extend.

Preferably, a rubber member is fixed to a corresponding one of each of the protrusions.

Preferably, a second flywheel is attached to the first plate.

Preferably, a bearing is mounted on a portion of the first flywheel, the first plate being mounted on the bearing such that the first plate and the first flywheel are configured for relative rotary displacement with respect to one another.

Preferably, the elastic member includes a plurality of springs arranged in series in a circumferential direction and a float body extending in a radial direction between ends of adjacent pairs of the springs.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
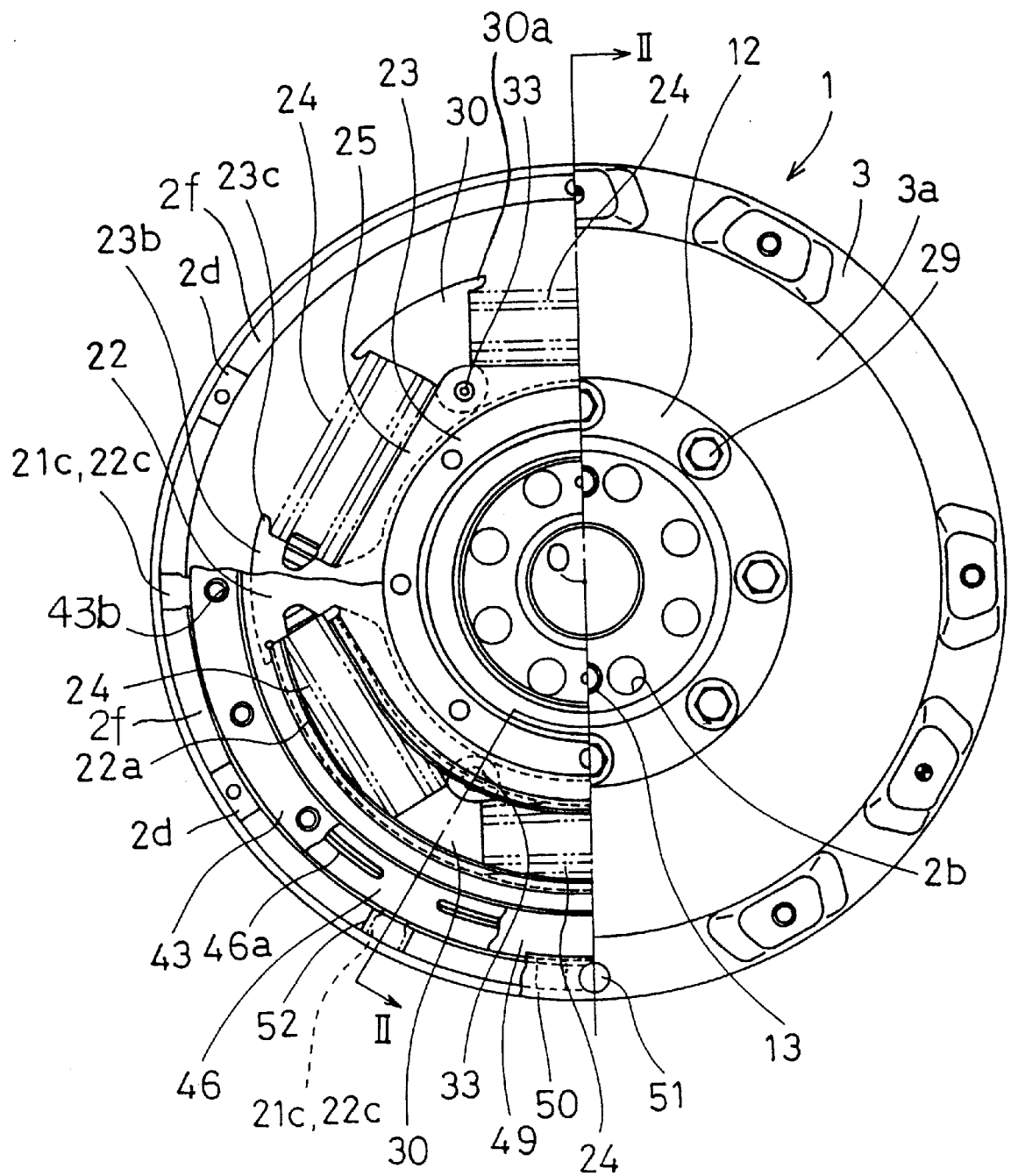
FIG. 1 is part elevational, part cutaway view of a flywheel assembly of in accordance with one embodiment of the present invention.
Figure 2:
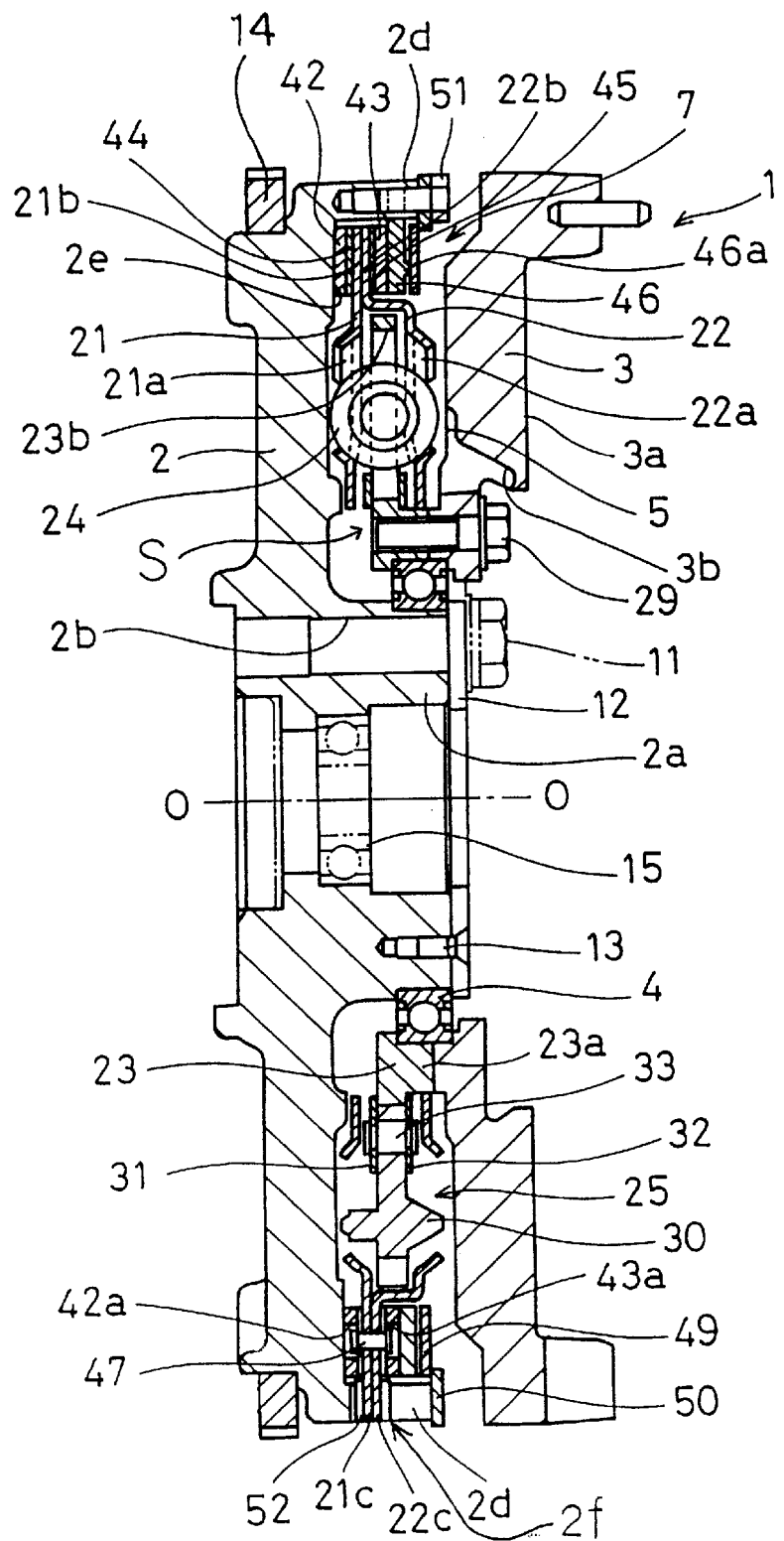
FIG. 2 is a cross section view of the flywheel assembly taken along line II—II in FIG. 1.
Figure 3:
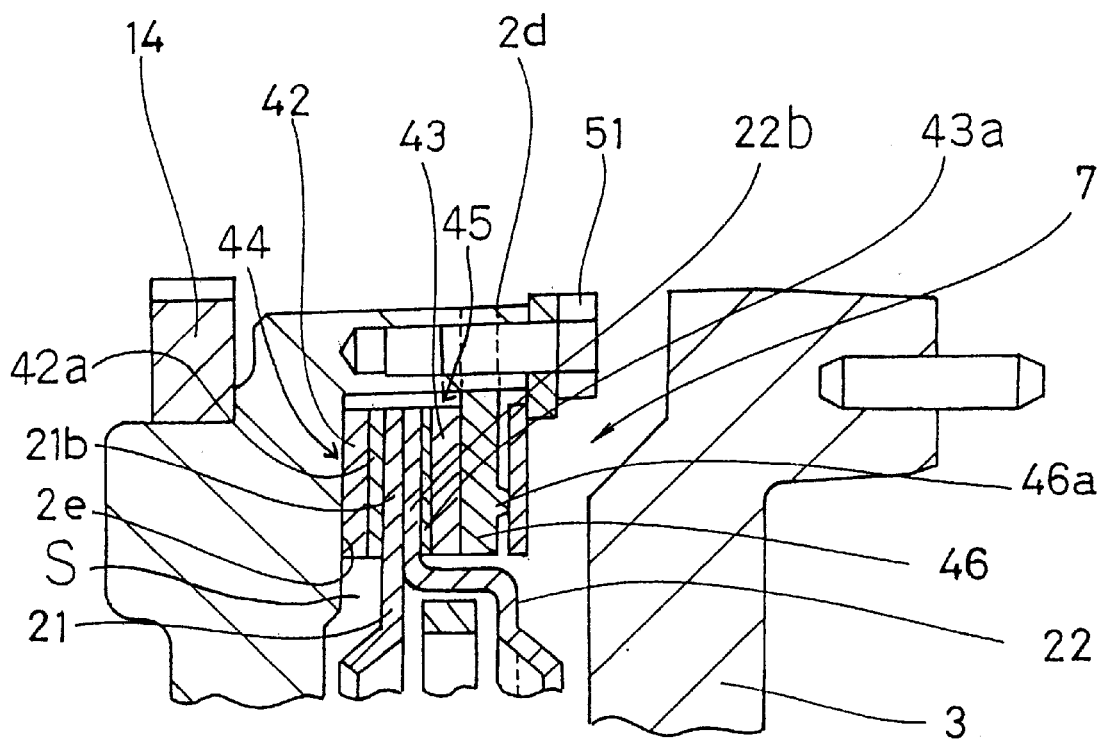
FIG. 3 a fragmentary cross section showing portions of the flywheel assembly depicted in FIG. 3, but on a slightly enlarged scale.
Figure 3:
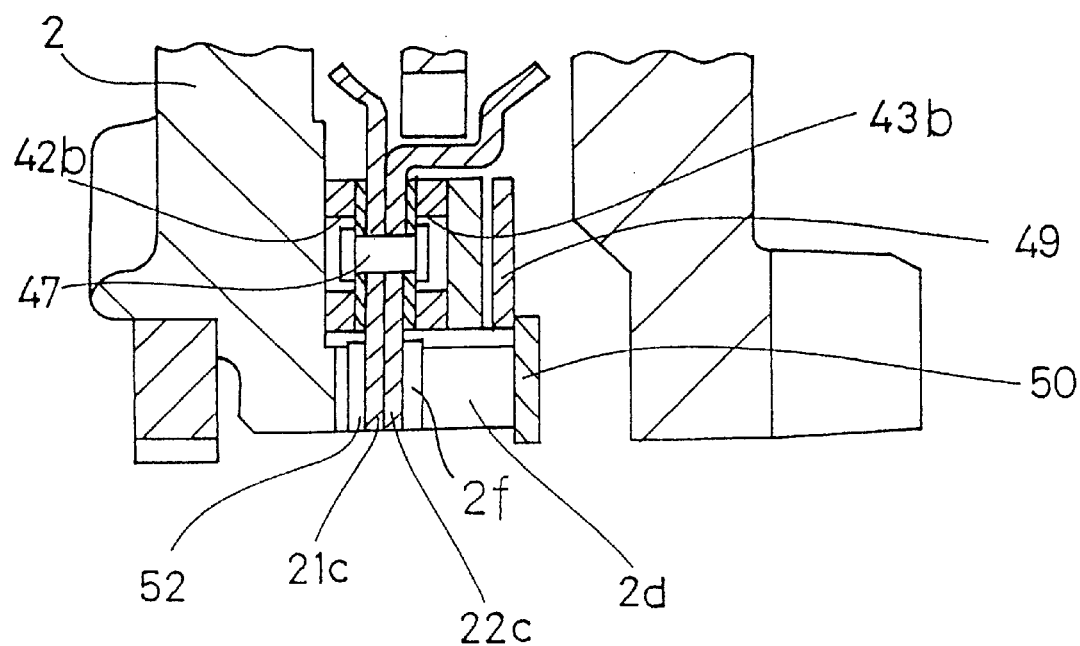

FIGS. 1, 2 and 3 show a flywheel assembly 1 of an embodiment of the invention. The flywheel assembly 1 is attached to a rear end of a crankshaft (now shown) of an engine for transmitting a torque to a transmission through a clutch device (not shown). The engine (not shown) is disposed to the left of FIG. 2 and the transmission (not shown) is disposed to the right of FIG. 2. Hereinafter for the purpose of providing relative directional orientation, the left side of FIG. 2 will be referred to as the engine side, and the right side of FIG. 2 will be referred to as the transmission side.

The flywheel assembly 1 is primarily formed of a first flywheel 2, a second flywheel 3, a frictional coupling mechanism 7 and a damper mechanism 5. The frictional coupling mechanism 7 and the damper mechanism 5 are arranged in series between the first flywheel 2 and the second flywheel 3 for transmitting a torque, as is described in greater detail below.

The first flywheel 2 is a circular disk-like member, and is provided at a central portion thereof with a cylindrical boss 2a extending toward the transmission side in FIG. 2. The central boss 2a is provided with an aperture 2b through which a crank bolt 11 is inserted. A bearing 15 is fixed to the inner periphery of the central boss 2a. The bearing 15 rotatably supports an end of a main drive shaft (not shown) extending from a transmission. A bearing 4 is arranged around the central boss 2a. For retaining the bearing 4, a circular fixing plate 12 is fixed to the end of the central boss 2a by bolts 13. A ring gear 14 is fixed to an outer periphery of the first flywheel 2. The outer peripheral portion of the first flywheel 2 is provided at a side surface thereof with a plurality of axially projecting stoppers 2d which extend toward the transmission side. The stoppers 2d are formed at circumferentially equally spaced positions, preferably at six of such positions. The stoppers 2d are further provided with threaded apertures for bolts.

Between the stoppers 2d, arcuate gaps 2f are defined. A flat annular frictional surface 2e is formed radially inward from the stoppers 2d. Within the first flywheel 2 an annular space S is defined. The stoppers 2d define a radial outward boundary of the annular space S and the flat annular frictional surface 2e extends radially within the annular space S.

The second flywheel 3 is a circular disk member having an inner diameter larger than the central boss 2a of the first flywheel 2. Together with a driven plate 23, which is described below, the inner peripheral portion of the second flywheel 3 is supported relatively rotatably around the central boss 2a of the first flywheel 2 through the bearing 4.

The second flywheel 3 is provided with a flat frictional surface 3a which is formed on the transmission side of the second flywheel 3. The second flywheel 3 is also provided at a portion radially inward from the friction surface 3a with a plurality of circumferentially long air apertures 3b. Each air aperture 3b axially extends through the second flywheel 3.

The damper mechanism 5 (damper unit) is disposed within the annular space S defined within the first flywheel 2. The damper mechanism 5 primarily includes a first drive plate 21, a second drive plate 22, a driven plate 23, a plurality of coil springs 24 and a floater mechanism 25, all of which function together to define a single unit. Therefore, during assembly, these members can be assembled into a subassembly, i.e., the damper mechanism 5 prior to a final assembling operations of the flywheel assembly 1, so that transportation and management of the damper mechanism 5 can be easy.

The first drive plate 21 and the second drive plate 22 are circular disk members formed by a sheet metal working, and are axially spaced by a predetermined distance from each other. The first and second drive plates 21 and 22 are provided at their radially middle portions with circumferentially long windows 21a and 22a. The first and second drive plates 21 and 22 have annular outer peripheral portions 21b and 22b which are in contact with each other and are fixed together by a plurality of rivets 47. These rivets 47 also connect first and second friction washers 42 and 43 in the frictional coupling mechanism 7, which are described below, to the outer peripheral portions 21b and 22b. Six projections 21c and six projections 22c, which are circumferentially equally spaced from each other, project radially outward from the outer peripheral portions 21b and 22b, respectively and extend into the arcuate gaps 2f. Each of the projections 21c and 22c is arranged circumferentially between the stoppers 2d of the first flywheel 2. A plurality of rubber member (buffer member) 52 are fitted around each of the projections 21c and 22c, one rubber member 52 to each pair of projections 21c and 22c. The rubber members 52 is disposed within the arcuate gaps 2f. As described above, the projections 21c and 22c, the stoppers 2d and the arcuate gaps 2f form a stopper mechanism for limiting a relative rotation between the first flywheel 2 and the first and second drive plates 21 and 22. Since the stopper mechanism is arranged at the radially outer portions of the first flywheel 2 and the first and second drive plates 21 and 22, it is not necessary to use conventional pins to limit relative rotation, and the structure can be simple. The rubber 52 which is the buffer member can be attached easily. In this embodiment, attachment and removal of the rubber 52 with respect to the projections 21c and 22c can be easily performed in the radial direction.

The driven plate 23 is a circular disk member arranged between the first and second drive plates 21 and 22. The driven plate 23 is provided at its inner peripheral portion with a boss 23a slightly extending toward the transmission side. Axial threaded apertures are formed at the boss 23a. Bolts 29 extend from a position on a transmission side of the second flywheel, through apertures formed at the inner peripheral portion of the second flywheel 3, and the bolts 29 are engaged with the threaded apertures in the boss 23a. Thus, the bolts 29 fix the driven plate 23 to the second flywheel 3.

The inner peripheral surface of the driven plate 23 is fixed to an outer race of the bearing 4. The driven plate 23 is provided with first windows corresponding to the windows 21a and 22a at the first and second drive plates 21 and 22. The first windows are not defined by outer peripheries, and therefore are opened radially outward. The first windows are defined in part by radially extending three support portions 23b formed on the driven plate 23. Thus, the foregoing first window are defined between the three support portions 23a. Each of the support portions 23b has a radially diverging form giving each a T shape appearance, as shown in FIG. 1, such that each support portion 23b has a radially outer portion circumferentially wider than a radially inner portion. Each support portions 23b is provided at its radially outer end with disengagement restricting portions 23c which extend in opposite circumferential directions.

A pair of coil springs 24 are disposed in each set of windows 21a and 22a formed in the first drive plate 21 and second drive plate 22 and the first window formed in the driven plate 23. Each pair of the coil springs 24 extends linearly in a tangential direction with respect to the damper mechanism. Each coil spring includes coaxial two coil springs of large and small diameters shown schematically in the upper portion of FIG. 2.

The floater mechanism 25 is disposed between the paired coil springs 24 in each window 21a and 22a, thus separating each of the paired coil springs 24, as shown in the upper portion of FIG. 1, and functions as an intermediate coupling mechanism for torque transmission between the paired coil springs 24. The floater mechanism 25 includes three floaters 30 and a pair of ringlike plates 31 and 32. Each floater 30 is disposed between the two coil springs 24 in each window 21a and 22a. Each floater 30 has a radially diverging form similar to the support portions 23b, and therefore has a radially outer portion circumferentially wider than a radially inner portion thereof. Each floater 30 is provided at its radially outer end with projections 30a which extend circumferentially oppositely from each other for restricting radially outward disengagement of the coil springs 24, respectively, as shown in. FIG. 2.

The portion of the floater radially inward from the projections 30a contact the end surfaces of the coil springs 24. Two annular plates 31 and 32 are disposed axially between the inner peripheral portions of the first and second drive plates 21 and 22. The radially inner end of the floater 30 is pivotally fixed to the annular plates 31 and 32 by a rivet 33.

Since three pairs of the coil spring series 24 are arranged in the damper mechanism 5, the torsional rigidity is low and the maximum displacement angle is relatively large. Therefore, it is not necessary to provide a frictional resistance generating mechanism which operates in parallel with the coil springs 24, and a torsional vibration can be damped only by a slight slide resistance occurring between the members. As a result, gear noises and internal resonance noises at the drive system during driving can be damped.

The frictional coupling mechanism 7 is provided for transmitting a torque between the first flywheel 2 and the damper mechanism 5, and for damping excessive torque variation, which may occur at or near a resonance frequency of the flywheel assembly 1, by causing the friction members to slide with respect to one another and thereby generating a large hysteresis torque.

As shown in FIG. 3 on an enlarged scale, the frictional coupling mechanism 7 is formed of a plurality of annular members such as a first friction washer 42, a second friction washer 43, a plate 46 and a conical spring 49. The frictional coupling mechanism 7 is arranged radially outside the damper mechanism 5.

A first annular plate 44 is formed integrally from a first friction washer 42 and a steel plate 42a. The first friction washer 42 and the steel plate 42a are fixed together by any of a variety methods, such as adhesive bonding, unitary molding process or sintering, etc. The first annular plate 44 is fixed to the outer peripheral portion 21b by rivets 47, as shown in FIG. 3. The first friction washer 42 contacts the friction surface 2e of the first flywheel 2 and friction is generated therebetween in response to relative rotation between the flywheel 2 and the plates 21 and 22. The first friction washer 42 is provided with circular apertures 42b accommodating heads of the rivets 47, respectively.

A second annular plate 45 integrally formed of a second friction washer 43 and a steel plate 43a and is fixed to an outer peripheral portion 22b by the rivets 47. The second friction washer 43 is in slidable contact with the plate 46. The second friction washer 43 is provided with circular apertures 43b accommodating heads of the rivets 47.

The plate 46 is in contact with one surface of the second friction washer 43 on the transmission side. The plate 46 is provided at its radially outer portion with engagement portions (shown at the bottom of FIG. 1). The engagement portions are engaged with the stoppers 2d of the first flywheel 2 and therefore, the plate 46 cannot rotate with respect to the first flywheel 2. However, the plate 46 may undergo axial movement relative to the first flywheel 2 and the stoppers 2d. The plate 46 is provided on a side surface thereof with a plurality of arc-shaped projections 46a, shown in FIG. 1 and the upper portion of FIG. 3. The conical spring 49 (biasing member) is disposed between the plate 46 and an annular plate 50. The outer periphery of the conical spring 49 contact the annular plate 50, biasing the plate 46 into engagement with the second friction washer 43. The annular plate 50 is fixed to the stoppers 2d by bolts 51. An inner periphery of the conical spring 49 is in contact with annular projections 46a of the plate 46. The conical spring 49 is axially compressed between the plate 46 and the annular plate 50.

The torque capacity of the frictional coupling mechanism 7 may be configured to be significantly larger than the maximum rated torque of the engine, and the hysteresis torque equal to double the torque capacity functions to damp the excessive torque variation at the time of resonance.

An operation of the flywheel assembly 1 will be described below.

When the engine (not shown) starts, a torque is transmitted from the crank shaft to the first flywheel 2. The torque is transmitted from the first flywheel 2 to the second flywheel 3 through the frictional coupling mechanism 7 and the damper mechanism 5.

When an excessive torque variation occurs at the flywheel assembly 1 during change through a resonance point in a low rotation speed region (e.g., rotation speed from 0 to 500 rpm), relative rotation occurs between the first flywheel 2 and the damper mechanism 5, and a slide occurs at the frictional coupling mechanism 7. More specifically, the first friction washer 42 slides on the first flywheel 2 and the first outer peripheral portion 21c, and the second friction washer 43 slides on the second outer peripheral portion 22c and the plate 46. Owing to a large hysteresis torque generated thereby, a torsional vibration is damped. As a result, breakage of the coil springs 24 forming the damper mechanism 5 as well as noises and vibrations are suppressed. Since the frictional coupling mechanism 7 is arranged radially outside the coil springs 24, each washer can have a larger radius than that in the prior art. Therefore, a pressing load to be applied to each washer by the conical spring 49 can be small, so that a surface pressure of each member can be small, and a hysteresis torque can be stable.

When a torsion angle of the first flywheel 2 with respect to the first and second drive plates 21 and 22 increases, the projections 21c and 22c come into contact with the stoppers 2d. At this time of contact, the rubbers 52 arranged at the projections 21c and 22c absorb a shock of impact. As a result, noises which may be caused by a conventional stopper mechanism employing pins can be suppressed. In the above structure, the projections 21c and 22c forming the stopper mechanism are formed of portions of the first and second drive plates 21 and 22 forming the damper mechanism 5, so that parts and members can be small in number, and the structure can be simple. Since the rubbers 52 are attached to the projections 21c and 22c made of the plates, they can be attached easily.

When a minute torsional vibration, which is due to a torque variation of the engine during an ordinary driving, is transmitted to the flywheel assembly 1, no slide occurs at the frictional coupling mechanism 7, and only the damper mechanism 5 operates. More specifically, the first and second drive plates 21 and 22 rotate relative to the driven plate 23, and the coil springs 24 are compressed. Since the coil springs 24 are arranged in series in the windows 22a and 21a, the torsional rigidity can be small, and the maximum torsion displacement angle can be large. Therefore, it is not necessary to provide a frictional resistance generating mechanism which operates in parallel with the coil springs 24, and the torsional vibration can be damped by a slight slide resistance occurring between the members. Consequently, gear noises and internal resonance noises at the drive system during driving can be reduced.

According to the flywheel assembly of the invention, since the frictional coupling mechanism is arranged radially outside the elastic coupling members, it can have a larger radius than that in the prior art. Therefore, a pressing load against the friction member can be reduced, and a magnitude of the hysteresis torque can be stable.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A flywheel assembly comprising:

a first flywheel, a radial mid-portion of said first flywheel having an annular chamber defined therein;

a first plate rotatably supported within said annular chamber for rotation with respect to said first flywheel, said first plate formed with a first window;

a second plate disposed adjacent to said first plate within said annular chamber, said second plate formed with outer peripheral portions and a second window radially inward from said outer peripheral portion;

an elastic member disposed in said first and second windows elastically coupling said first and second plates limiting relative rotary displacement therebetween;

a frictional coupling mechanism fixed to said outer peripheral portion radially outward from said first and second windows and said elastic member, said frictional coupling mechanism being configured to generate friction in response to relative rotary displacement between said second plate and said first flywheel thus limiting relative rotary displacement therebetween, said frictional coupling mechanism comprising;

first and second friction washers fixed to opposite sides of said outer peripheral portion of said second plate, said first friction washer contacting an annular surface formed within said annular chamber of said first flywheel;

a pressing plate contacting said second friction washer;

an annular spring engaging a surface of said pressing plate; and a retaining plate fixed to an outer peripheral portion of said first flywheel such that said first and second friction washers, said pressing plate, said annular spring and said outer peripheral portion are disposed between said retaining plate and said annular surface within said chamber such that said annular spring urges said pressing plate toward said second friction washer and urges said first friction washer against said annular surface; and wherein said first flywheel is formed with a plurality of circumferentially spaced apart stopper portions at a radially outward periphery thereof, each of said outer peripheral portions of said second plate formed with a radially extending protrusion, each of said protrusions extending between circumferentially adjacent pairs of said stopper portions thus limiting relative rotary displacement between said second plate and said first flywheel to a predetermined angle, said pressing plate is fixed to said stopper portions such that said pressing plate rotates together with said first flywheel and may undergo limited axial movement in response to wear of said first and second friction washers, and, portions adjacent said stopper portions of said first flywheel define circumferentially extending slits into which said protrusions extend.

2. The flywheel assembly as set forth in claim 1, wherein a rubber member is fixed to a corresponding one of each of said protrusions.

3. The flywheel assembly as set forth in claim 1, further comprising a second flywheel attached to said first plate.

4. The flywheel assembly as set forth in claim 1, further comprising a bearing mounted on a portion of said first flywheel, said first plate being mounted on said bearing such that said first plate and said first flywheel are configured for relative rotary displacement with respect to one another.

5. The flywheel assembly as set forth in claim 1, wherein said elastic member comprises:

a plurality of springs arranged in series in a circumferential direction;

a float body extending in a radial direction between ends of adjacent pairs of said springs.

* * * * *